(12) United States Patent
Toth (10) Patent No.: US 8,417,400 B2
(45) Date of Patent: Apr. 9, 2013

(54) CONTROL SYSTEM FOR HYBRID VEHICLES WITH RECONFIGURABLE MULTI-FUNCTION POWER CONVERTER

(75) Inventor: Akos Toth, Etobicoke (CA)

(73) Assignee: A123 Systems, Inc., Waltham, MA (US)

( * ) Notice: Subject to any disclaimer, the term of this patent is extended or adjusted under 35 U.S.C. 154(b) by 1045 days.

(21) Appl. No.: 12/028,772

(22) Filed: Feb. 8, 2008

(65) Prior Publication Data

US 2008/0215200 A1    Sep. 4, 2008

Related U.S. Application Data

(60) Provisional application No. 60/888,991, filed on Feb. 9, 2007, provisional application No. 60/889,022, filed on Feb. 9, 2007.

(51) Int. Cl.
*G06F 19/00* (2011.01)

(52) U.S. Cl. .......................................... 701/22; 903/903

(58) Field of Classification Search .................. 701/22; 320/163, 162, 138, 108–122, 124–127, 132, 320/134; 180/65.285, 65.245, 65.29, 65.4, 180/65.28, 65.27, 65.1, 65.275; 903/902, 903/903, 906, 907; 318/139, 143, 157, 245; 322/23, 28
See application file for complete search history.

(56) References Cited

U.S. PATENT DOCUMENTS

| | | | |
|---|---|---|---|
| 4,564,798 A | 1/1986 | Young | |
| 5,373,195 A | 12/1994 | De Doncker et al. | |
| 5,710,699 A | 1/1998 | King et al. | |
| 5,926,004 A * | 7/1999 | Henze | 320/109 |
| 6,392,380 B2 | 5/2002 | Furukawa et al. | |
| 6,424,157 B1 | 7/2002 | Gollomp et al. | |
| 6,426,608 B2 * | 7/2002 | Amano et al. | 320/163 |
| 6,476,571 B1 | 11/2002 | Sasaki | |
| 6,946,166 B2 * | 9/2005 | Iso et al. | 427/536 |
| 7,049,792 B2 | 5/2006 | King | |
| 7,486,034 B2 * | 2/2009 | Nakamura et al. | 318/139 |
| 2005/0077867 A1 * | 4/2005 | Cawthorne et al. | 320/104 |
| 2005/0151509 A1 * | 7/2005 | Cook | 320/116 |
| 2005/0151517 A1 * | 7/2005 | Cook et al. | 323/207 |
| 2006/0250902 A1 | 11/2006 | Bender et al. | |
| 2007/0068714 A1 * | 3/2007 | Bender | 180/65.4 |
| 2007/0111044 A1 * | 5/2007 | Chang | 429/9 |

OTHER PUBLICATIONS

European Search Report for European Patent Application No. EP08729474 mailed Jun. 17, 2010. 5 pages.
International Search Report and Written Opinion issued for PCT/US05/53520, mailed Jun. 27, 2008 (9 pages).

* cited by examiner

*Primary Examiner* — Thomas Black
*Assistant Examiner* — Marthe Marc-Coleman
(74) *Attorney, Agent, or Firm* — Wilmer Cutler Pickering Hale and Dorr LLP (57) ABSTRACT

A multi-directional power conversion system for providing power to a motor of a hybrid vehicle includes an electric control unit; an electric motor which provides a driving force to the vehicle; a primary energy storage device; and a secondary energy storage device. An energy management system communicates parameters of the energy storage devices to the electronic control unit. A power manipulating device is coupled between the primary energy storage device and the secondary energy storage device that is configured to manage power between the energy sources and deliver electricity external the vehicle.

23 Claims, 11 Drawing Sheets

FIG.15

CONTROL SYSTEM FOR HYBRID VEHICLES WITH RECONFIGURABLE MULTI-FUNCTION POWER CONVERTER

This application claims benefit of co-pending U.S. Provisional Application Nos. 60/888,991 and 60/889,022, both filed Feb. 9, 2007, entitled "Control System for Hybrid Vehicle With Plurality of Energy Sources" and "Reconfigurable Multi-Function Power Converter for Electric Vehicle Applications" respectively. The disclosures of the applications are hereby incorporated by reference in their entirety.

FIELD OF THE NON-LIMITING EMBODIMENTS OF THE INVENTION

An exemplary embodiment of the present invention is directed generally to a control system, and more particularly, to a control system for use in a hybrid vehicle that includes at least two energy storage devices connected to a power converter.

BACKGROUND OF THE NON-LIMITING EMBODIMENTS OF THE INVENTION

In a typical hybrid electric vehicle (HEV), a high powered battery supplies power to the hybrid drive train containing electric motors. Under heavy load conditions, the high powered battery can supply additional energy to augment the energy supplied through the vehicle's internal combustion engine, thereby improving performance. The battery can then be recharged during lighter load conditions, or charged from energy generated during vehicle deceleration. Due to the high power restraints placed on the battery, it must maintain a state of charge (SOC) within a narrow operating range to ensure long life. Also, a buffer below full charge of the battery must remain to allow energy to be recaptured when the vehicle decelerates while the battery is "fully charged." Consequently, a shortcoming of this typical HEV system is that the maximum capacity of this battery can never be fully utilized for vehicle propulsion.

More than one power source may also be used to provide power to the vehicle. For example, a high power battery pack may be used in unison with a high capacity battery pack in order to provide both high capacity and high power. Also, a solar panel may be used alongside a battery pack in order to capture the energy production capabilities of the solar panel as well as the storage capability of the battery pack. This integration of multiple energy sources in conjunction with the load of the vehicle itself can be achieved if energy can freely and efficiently be exchanged between such sources to the vehicle or any other load.

SUMMARY OF THE NON-LIMITING EMBODIMENTS OF THE INVENTION

An illustrative, non-limiting embodiment of the present invention is a system of operation and control of energy flow in a vehicle having a plurality of energy storage devices. An example of such vehicle would be a hybrid vehicle with at least two energy storage devices, a primary energy storage device such as a nickel metal hydride (NiMH) battery, lithium ion (LI) battery or super/ultra capacitor bank, coupled to a secondary energy storage device such as either of those used as a primary device. The energy devices can be recharged, either individually or collectively, through an external energy source such as the energy supplied through an ordinary electrical socket powered by the electrical grid. The two energy storage devices can be directly coupled to the drivetrain of the vehicle. Alternatively, it can be coupled through a multi-function power converter which allows for a buck, boost or isolated mode of operation, in which energy is transferred in a bi-directional manner between the energy storage devices.

An additional battery enables the system to supply additional electrical energy, as well as absorb increased amounts of regenerated power supplied during deceleration of the vehicle. The external energy source interface allows for the recharging of either the primary or secondary battery, individually or collectively. The external energy provided optimizes operation of the vehicle by propulsion of the vehicle from the external energy stored in the batteries, propulsion from the internal combustion engine, or a combination of the two.

An aspect of a non-limiting embodiment of the invention may provide for a DC to AC and AC to DC conversion in order to allow for the free exchange of energy between the hybrid vehicle and an outside power source or load. For example, it may be desirable for a user to utilize a common household appliance when there is no other AC outlet is available. An illustrative, non-limiting embodiment of the present invention provides for an AC electrical outlet within the system and the ability for the control system to switch to a mode that will allow energy from the energy sources to be transferred to the drivetrain of the hybrid vehicle. Accordingly, a hybrid vehicle user has the ability to supply AC power to devices while energy is not being supplied to the drivetrain of the vehicle. In an exemplary embodiment, an ordinary AC outlet may be affixed to the secondary energy source.

Furthermore, in accordance with an aspect of an exemplary embodiment, the energy could be provided to the electricity grid if the control system determines this to be necessary. Periodically, electrical grids, which provide electricity, experience power failures. If this were to occur, an embodiment of the invention, while plugged into an ordinary electrical outlet could switch to a mode that would enable energy to be taken from either primary or secondary energy batteries and supplied to the electrical grid.

Aspects of other, non-limiting embodiment may also optimize energy flow between multiple devices, e.g., the primary and secondary energy storage device, the external energy source and the hybrid vehicle itself. The two energy storage devices may be coupled through a power converter. In accordance with an exemplary embodiment of the present invention, a ontroller communicates with each energy storage device, the vehicle, a reconfigurable multi-function power converter and an energy management system which supplies vehicle and energy storage device data to the controller. The controller regulates the energy flow between the three devices based on vehicle operating parameters. Specifically, the controller communicates with the power converter that either enables or disables a series of electronic switches to produce the desired mode of operation in accordance with information received from the energy management system.

In accordance with an exemplary embodiment, a hybrid drive system is provided that comprises an engine and an electric motor which provide power to the vehicle. A primary energy storage device stores electrical energy, in addition to a secondary energy storage device. An electronic control unit (ECU) monitors a state of charge of the primary energy storage device and the secondary energy storage device. A power converter manipulates power transfer between the primary energy source and the secondary energy source.

In accordance with a further exemplary embodiment, a multi-directional power conversion system for providing power to a motor of a hybrid vehicle is provided, which comprises an electric control unit; an electric motor which provides a driving force to the vehicle; a primary energy storage device; and a secondary energy storage device. An energy management system communicates parameters of the energy storage devices to the ECU. A power manipulating device is coupled between the primary energy storage device and the secondary energy storage device and is configured to manage power sent to the electric motor.

BRIEF DESCRIPTION OF THE DRAWINGS

Other aspects of non-limiting embodiments of the present invention will become apparent from the following description taken in conjunction with the accompanying drawings.

DETAILED DESCRIPTION OF THE INVENTION

The following detailed description is directed to certain embodiments of the invention. However, other embodiments can be embodied in a multitude of different systems and methods.

Figure 1:
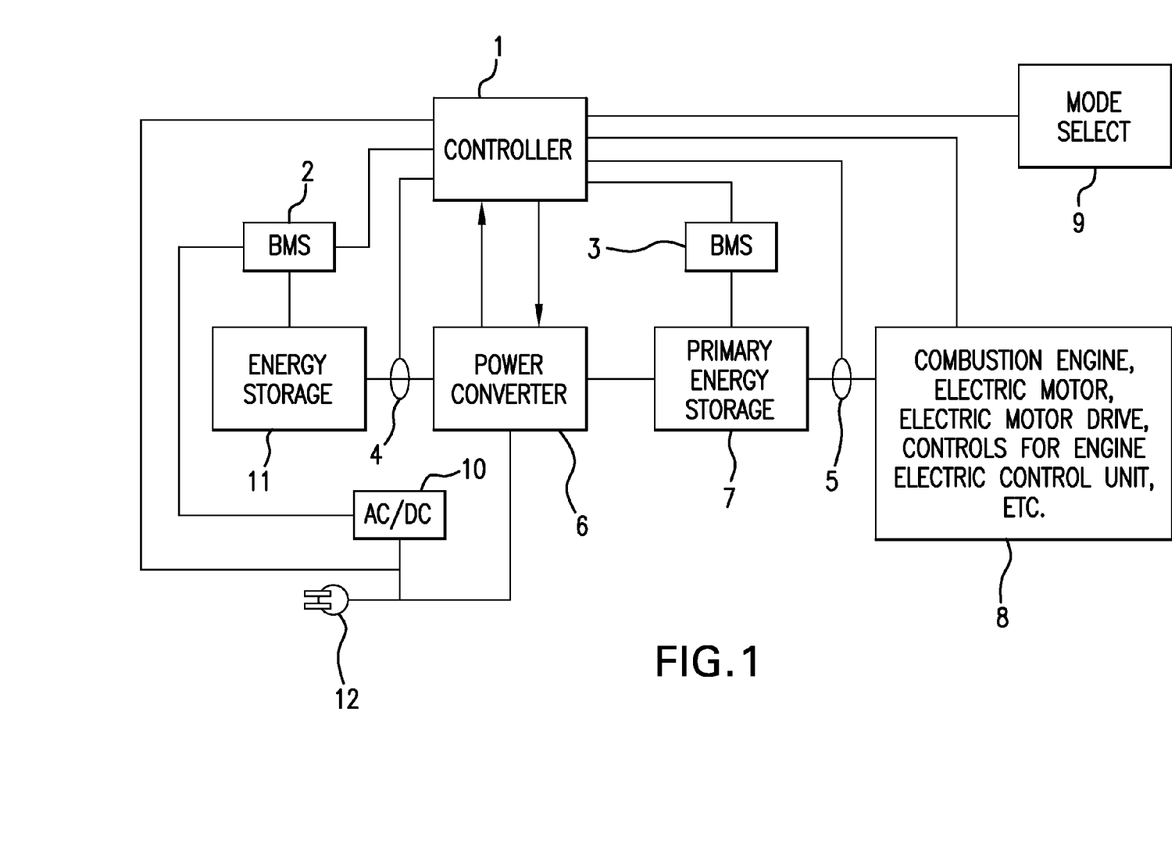
FIG. 1 is a block diagram showing a general structure of an illustrative, non-limiting embodiment of the present invention.

FIG. 1 is a block diagram schematically illustrating two energy storage devices based in a hybrid vehicle architecture. A primary energy storage (e.g., a battery) 7 is coupled to a secondary energy storage 11 through a reconfigurable multifunction power converter 6. A controller or ECU 1 communicates with battery management systems (BMS) 2 and BMS 3 and monitors current sensors 4 and 5. The ECU 1 also communicates with elements of the vehicle 8, including a combustion engine, electric motor, electric motor drive, controls for the engine, the vehicle's internal ECU, and the like through a communications bus, such that a controller area network (CAN) is created. The ECU 1 is connected to the power converter 6, which manipulates power in accordance with communications from the ECU 1. For instance, power transfer from the secondary energy storage 11 to the primary energy storage 7 or vehicle 8, as well as power transfer from an electrical grid 12 is controlled by the ECU 1. An AC/DC power converter 10 is connected to the charging inlet of the vehicle 8 and provides auxiliary power to the ECU 1 when connected to the electrical grid 12 and indicates the presence of grid power to the ECU 1.

The secondary energy storage 11 may contain a plurality of battery modules connected in a series arrangement or other arrangement. Each module can be comprised of a parallel, serial or combination thereof battery cell configuration. The BMS 2 is connected to the secondary energy storage 11 and monitors various battery parameters, which it then communicates to the ECU 1 and to the vehicle 8 through the ECU 1. The ECU 1 also monitors the state of charge of the secondary energy storage or module (Ssoc) 11 based on the parameters it receives from the BMS 2, including information, such as cell voltages, temperatures or current sensor 4 data.

The reconfigurable power converter 6 may be connected to an external energy source such as the electrical grid 12. The ECU 1 controls the converter 6 and may disable the hybrid vehicle or load when it senses that the electrical grid 12 is present. Upon sensing the presence of an electrical grid 12, energy sources 7 and 11 can be charged or alternatively, can supply AC power to the electrical grid 12 via the reconfigurable power converter 6.

Figure 2:
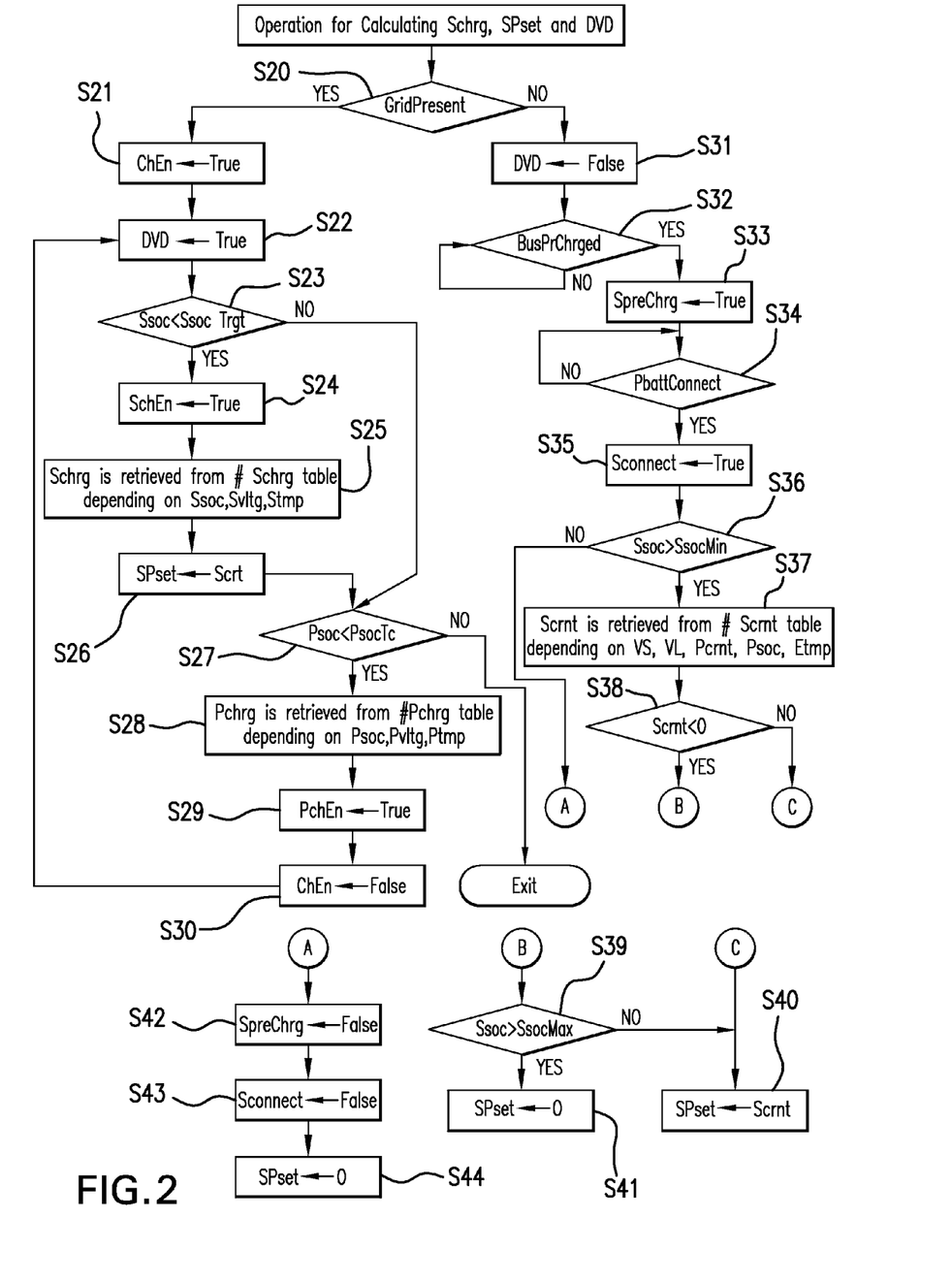
FIG. 2 is a flowchart showing the determination of control parameters according to an illustrative non-limiting embodiment of the present invention.
Figure 3:
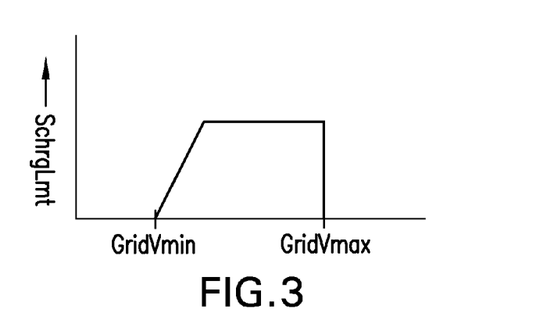
FIG. 3 is a graph based on a secondary battery charge limit table according to an illustrative non-limiting embodiment of the present invention.
Figure 4:
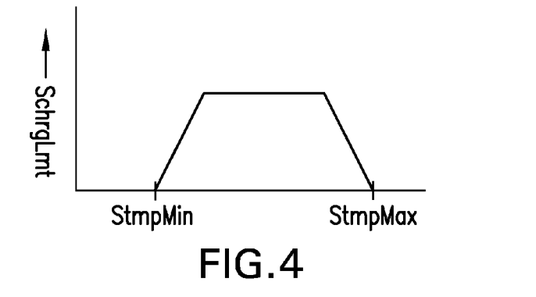
FIG. 4 is a graph representing the secondary charge limit as a function of temperature according to an illustrative non-limiting embodiment of the present invention.
Figure 5:
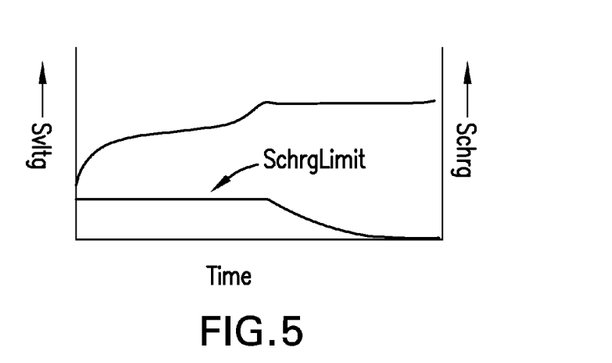
FIG. 5 is a graph representing the secondary battery charge limit according to an illustrative embodiment of the present invention.

FIG. 2 is a flow diagram of the controller or ECU 1. When the ECU 1 determines that the electrical grid 12 is present (operation S20: Yes), the system is in a charging mode. As such, the power converter 6 is set to a charge enabled status (operation S21), and a disable vehicle drive (DVD) signal is also set to prevent vehicle movement while connected to the electrical grid 12 (operation S22). The ECU 1 compares a state of charge of the secondary battery 11 to a target set-point of the secondary battery 11 (SsocTrgt) (operation S23). If the Ssoc is less than SsocTrgt (operation S23: Yes), charging of the secondary battery 11 is enabled (SchEn) (operation S24). In one implementation, the value of a charge limit (SchargLmt) is determined based on a charge limit table which identifies a relationship between the voltages of the electrical grid 12 and the SchrgLmt (FIG. 3). The SchrgLmt is further modified based on the high (StmpMax) or low (StmpMin) temperatures as shown in FIG. 4 (operation S25). The SchargLmt is further modified based on a battery cell voltage which is determined by a table that identifies the relationship between voltage and current (operation: S25) (FIG. 5). The power controller 6 is set to maintain a charge current (Scrnt) at SchrgLmt by setting a secondary state of charge set-point (SPset) (operation S26) or an optimal state of charge according to current conditions.

Figure 6:
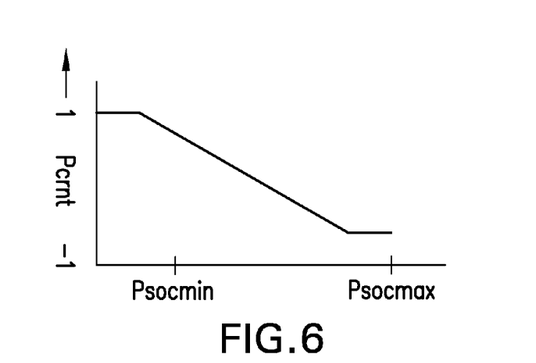
FIG. 6 is a graph based on a primary battery current as a function of the primary state of charge according to an illustrative non-limiting embodiment of the present invention.
Figure 7:
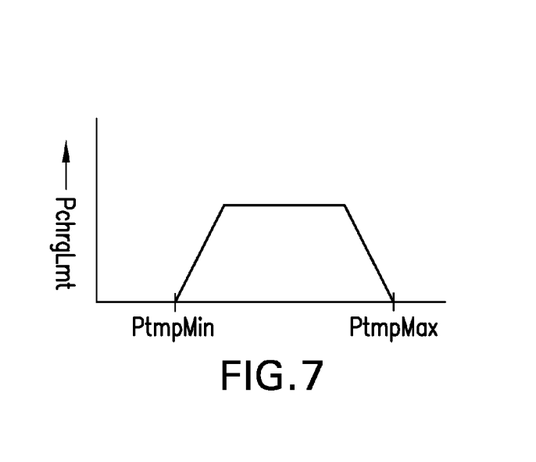
FIG. 7 is a graph based on a primary battery charge limit as a function of temperature according to an illustrative non-limiting embodiment of the present invention.

After the Ssoc rises above the SsocTrgt, the state of the charge of the primary energy storage or battery 7 (Psoc) is checked (operation S27). If Psoc is less than the primary state of charge target (PsocTc) (operation S27: Yes), then the primary battery charge set-point is retrieved from the Pchrg table (FIG. 6) (operation S28), which demonstrates a relationship between current and the minimum and maximum state of charge. Also, PsocTc is further modified based on the charge temperature Limit (PchrgLmt) which is determined by a relationship between temperature and minimum or maximum charge (FIG. 7). Then the primary energy storage 7 is enabled (PchEn) (operation S29), and the power converter 6 is set to maintain the charge current to the PchrgLmt by setting PPset.

Then, the power converter 6 stops its charging operation (operation S30), and the flow returns to operation S22. In operation S27, when Psoc becomes greater than PsocTc (operation S27: No), the Ssoc is again verified, and the charging of the power converter 6 is disabled upon the completion of charging of both energy storage 7 and 11.

Figure 8:
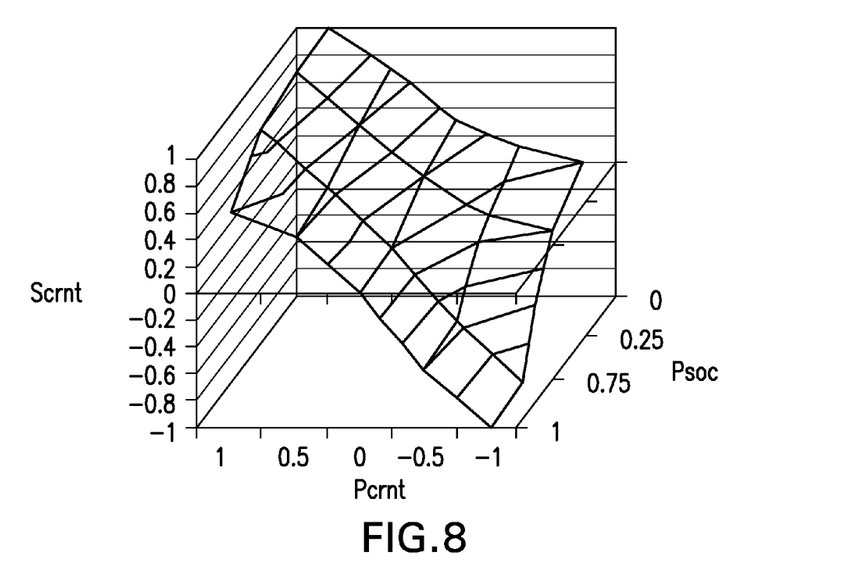
FIG. 8 is a three-dimensional graph representing the secondary battery current according to an illustrative embodiment of the present invention.

If the ECU 1 determines that the grid 12 is not preset (operation S20: No), the DVD signal is set to allow vehicle movement (operation S31). The ECU 1 waits for a vehicle bus to be pre-charged (BusPrChrg) (operation S32: Yes), and the secondary bus pre-charge is initiated by setting SpreChrg to True (operation S33). Once the secondary battery bus is pre-charged, the ECU 1 waits for the primary battery 7 to connect to the vehicle bus by determining if a primary battery connect (PbattConnect) signal is present (operation S34: Yes). At this point, the secondary battery 11 can also be connected (Sconnect), by setting Sconnect to true (operation S35). Next, if Ssoc is above the minimum set point (SsocMin) (operation S36: Yes) the ECU 1 retrieves the secondary battery current set-point (Scrnt) from the table shown in FIG. 8. This value is determined based on vehicle information such as vehicle speed (VS), vehicle load (VL), the temperature of the internal combustion engine (Etmp), and primary current (Pcrnt) (operation S37).

The resultant Scrnt is evaluated, and if Scrnt is negative (operation S38: Yes), Ssoc is checked to determine if it is below a secondary state of charge maximum (SsocMax) (operation S39). If Ssoc is less than SsocMax (operation S39: No), SPset is set to Scrnt (operation S40). Otherwise (operation S39: Yes), Spset is set to 0 (operation S41).

On the other hand, if Scrnt is positive (operation S38: No), SPset is set to Scrnt (operation S40).

If the Ssoc is below SsocMin (operation S36: No), the system is shut down by setting Sprechrg and Sconnect to false and SPset to 0 (operations S42-S44).

Figure 9:
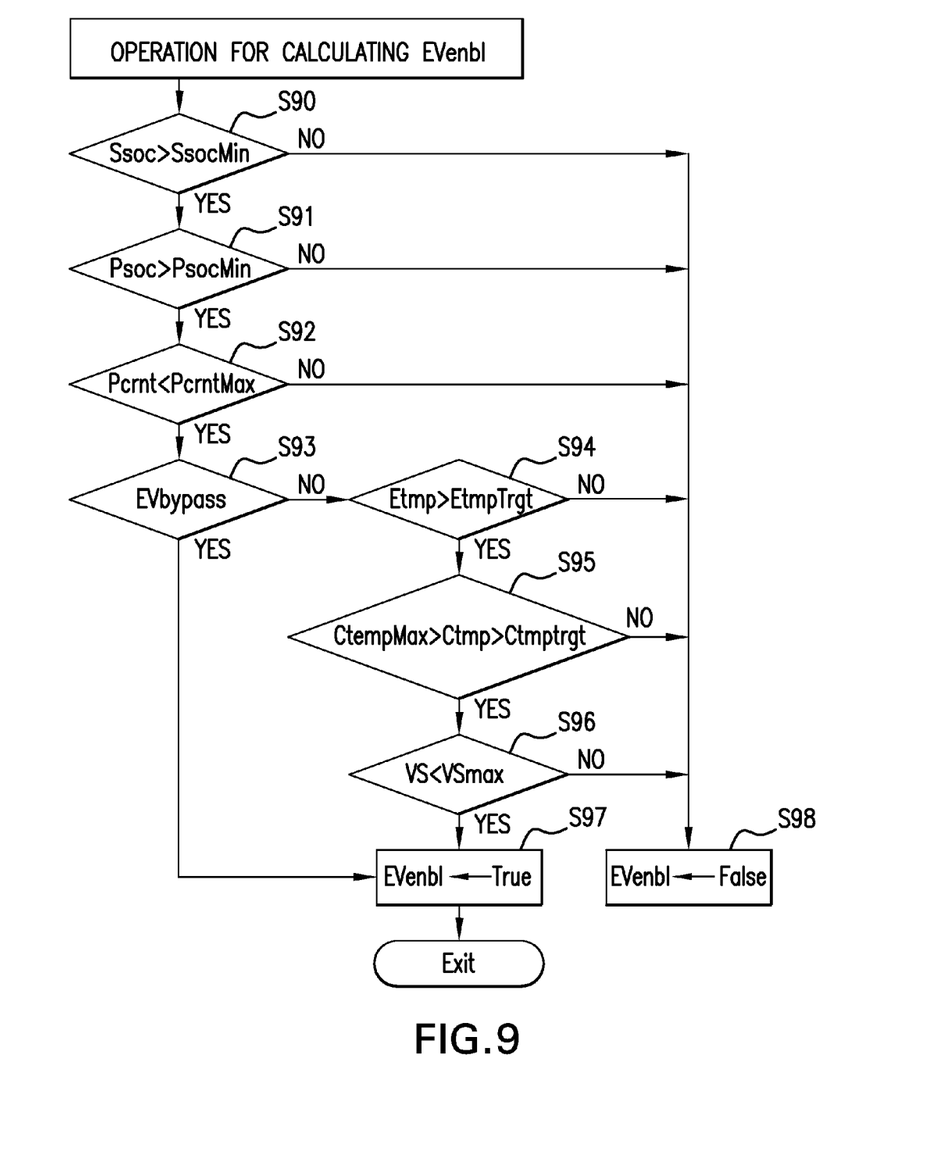
FIG. 9 is a flow chart representing a secondary charge limit according to an illustrative non-limiting embodiment of the present invention.

FIG. 9 is a flow diagram of the ECU 1 to determine whether or not the vehicle 8 is in a vehicle enabled (EVenbl) mode, which allows battery power from the primary battery 7 and/or the secondary battery 11 to be supplied to the vehicle 8. As shown, if the ECU 1 determines that Ssoc is greater than SsocMin (operation S90: Yes), the value Psoc is checked (operation S91). If Psoc is above a primary state of charge minimum (PsocMin) (operation S91: Yes), the ECU 1 determines if Pcrnt is less than the primary current set point maximum (PcmtMax) (operation S92). If so (operation S92: Yes), a user selectable by pass (EVbypass) input, which sets the ECU 1 to run only off battery power without warming up the engine and catalyst, is verified (operation S93). A non-limiting embodiment may include an user operable push button located within the interior of the vehicle 8, which would allow manipulation of the ECU 1, including toggling the EVbypass function. If the user selects the bypass (operation S93: Yes), EVenabl is set to true (operation S97). Otherwise (operation S93: No), the ECU 1 will check to see if the engine temperature (Etmp) is above its target (EtempTrgt) (operation S94), the catalyst temperature (Ctmp) is between a maximum catalyst temperature (CtempMax) and a target temperature (CtmpTrgt) (operation S95), and if the vehicle set point (VS) is below a maximum vehicle speed set-point (operation S96). If so (operations S94: Yes, S95: Yes, and S96: Yes), the vehicle is placed in the vehicle enabled mode (operation S97). On the other hand, as shown in FIG. 9, if various conditions are not met (operation S90: No, S91: No, S92: No, S94: No, S95: No, or S96: No), the vehicle is not placed in the vehicle enabled mode (operation S98).

Figure 10:
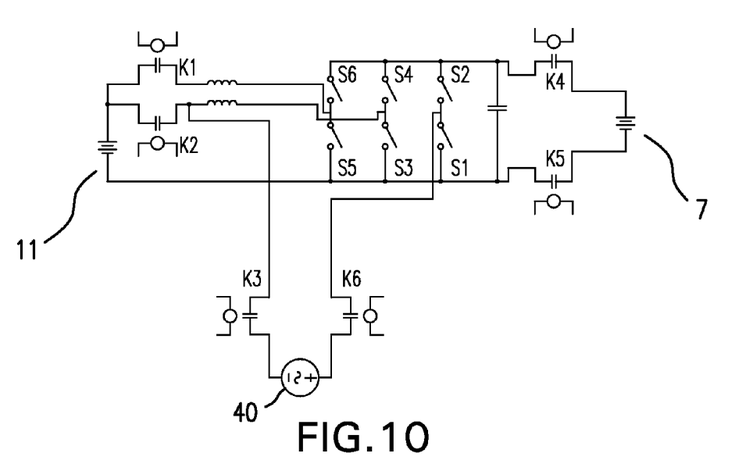
FIG. 10 is an illustrative embodiment of a bidirectional power converter in a non-manipulated state.

FIG. 10 is an example of the structure of the power converter 6. It is composed of a generic three phase H bridge electronic circuit and six contactors K1-K6. The device has various modes of operation based on the activation of the contactors K1-K6 and the switching scheme employed by the ECU 1. According to the manipulation of the various switches S1-S6, as a result of various switching algorithms, a DC bus voltage can be transferred between the primary energy storage 7 and the secondary energy storage 11, or alternatively an AC waveform 3 can be generated by the power converter 6.

Figure 11:
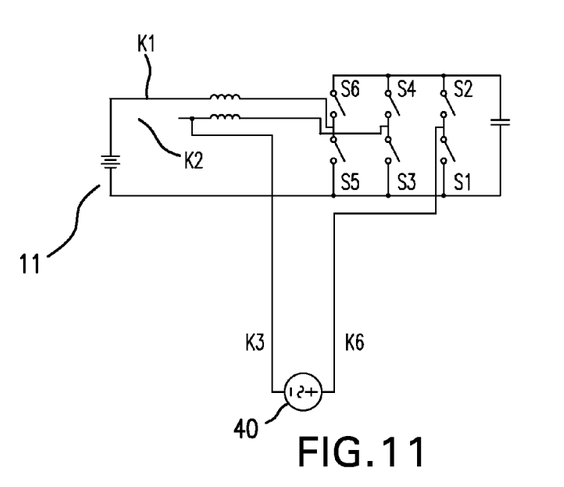
FIG. 11 is an illustrative embodiment of a bi-directional power converter in charging, grid connect or power generation modes.

FIG. 11 is an example of an illustrative non-limiting embodiment of the power converter 6. In this configuration, the contactors K1, K3 and K6 are on, the contactors K2, K4 and K5 are off, and the converter can operate in a battery charging mode, a grid connect mode and a power generation mode.

In the battery charging mode, switches S1, S2, S3 and S4 of the H bridge are used to rectify the AC waveform 40 and generate a current profile to ensure that a unity power factor is maintained. This current waveform is sampled by the controller 1 in order to ensure that the unity power factor is maintained. Switch S6 is used to buck the DC bus voltage down to a voltage level for the secondary energy storage 11 and charge the storage 11.

In the grid connect mode, switches S1,S2,S3 and S4 are used to generate the required current profile. Switches S5 and S6 is used as a bi-directional DC-to-DC converter that can either regulate the DC bus voltage to a pre-determined value or control power flow to and from the secondary energy storage 11.

The power generation mode is similar to the battery charging or grid connect mode. However, the converter 6 receives DC power from the storage 11, and the switches S1, S2, S3 and S4 are used as voltage sources to generate an AC waveform 40. Switch S6 is operated as a boost converter to step up the voltage of the secondary energy storage device to the required level for generating the AC waveform.

Figure 12:
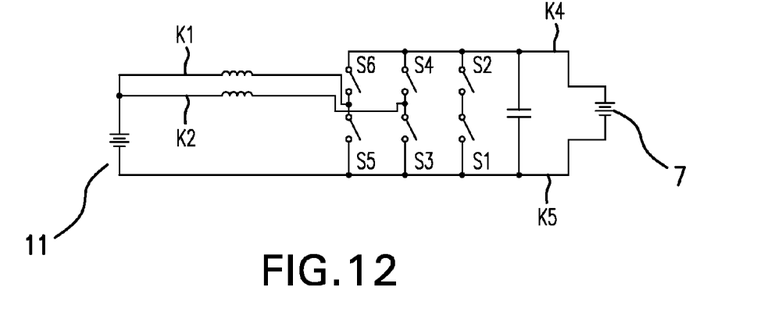
FIG. 12 is an illustrative embodiment of the bi-directional power converter in power a transfer mode.
Figure 14:
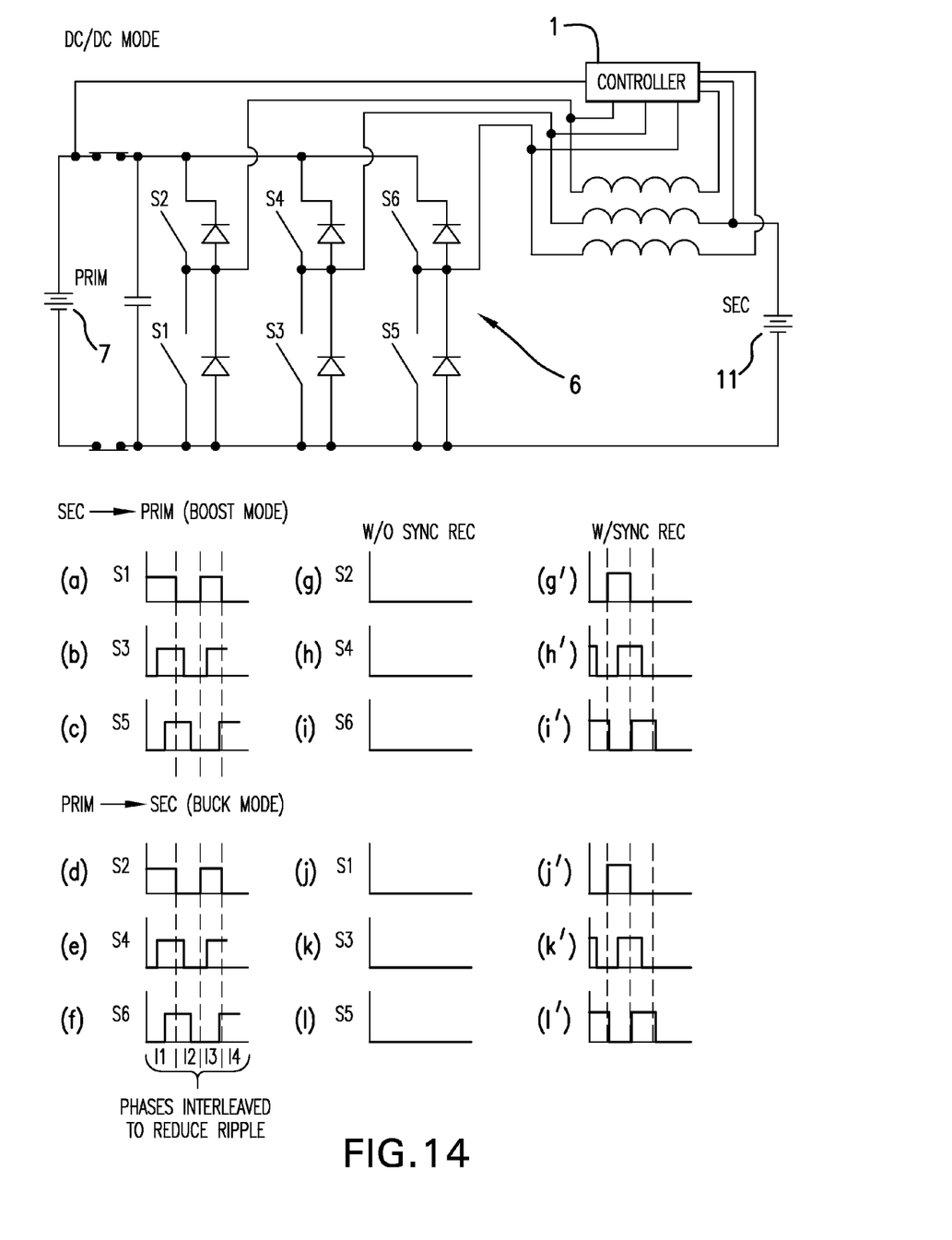
FIG. 14 is an illustrative embodiment of the bi-directional power converter in DC-to-DC (Buck/Boost) mode demonstrating different switching components and phases.

FIG. 12 is an example of the converter 6 when it operates in a multiphase bi-directional power converter mode, which allows DC-to-DC transfer between energy storage 7 and secondary energy storage 11. In this mode of operation, the contactors K1, K2, K4 and K5 are on, and the contactors K3 and K6 are off. Also, the switches S3, S4, S5 and S6 are used to control power flow between the primary energy storage 7 and the secondary energy storage 11. In the case of light loads, there is an option of enabling only one phase in order to improve efficiency. The use of only one phase reduces switching loss, which is the main contributor to power loss within the system. This allows the system to achieve maximum power from the energy storage devices. Optionally, another inductor/contactor can be added, such that switch S1 and S2 can be used as well as shown in FIG. 14.

Figure 13:
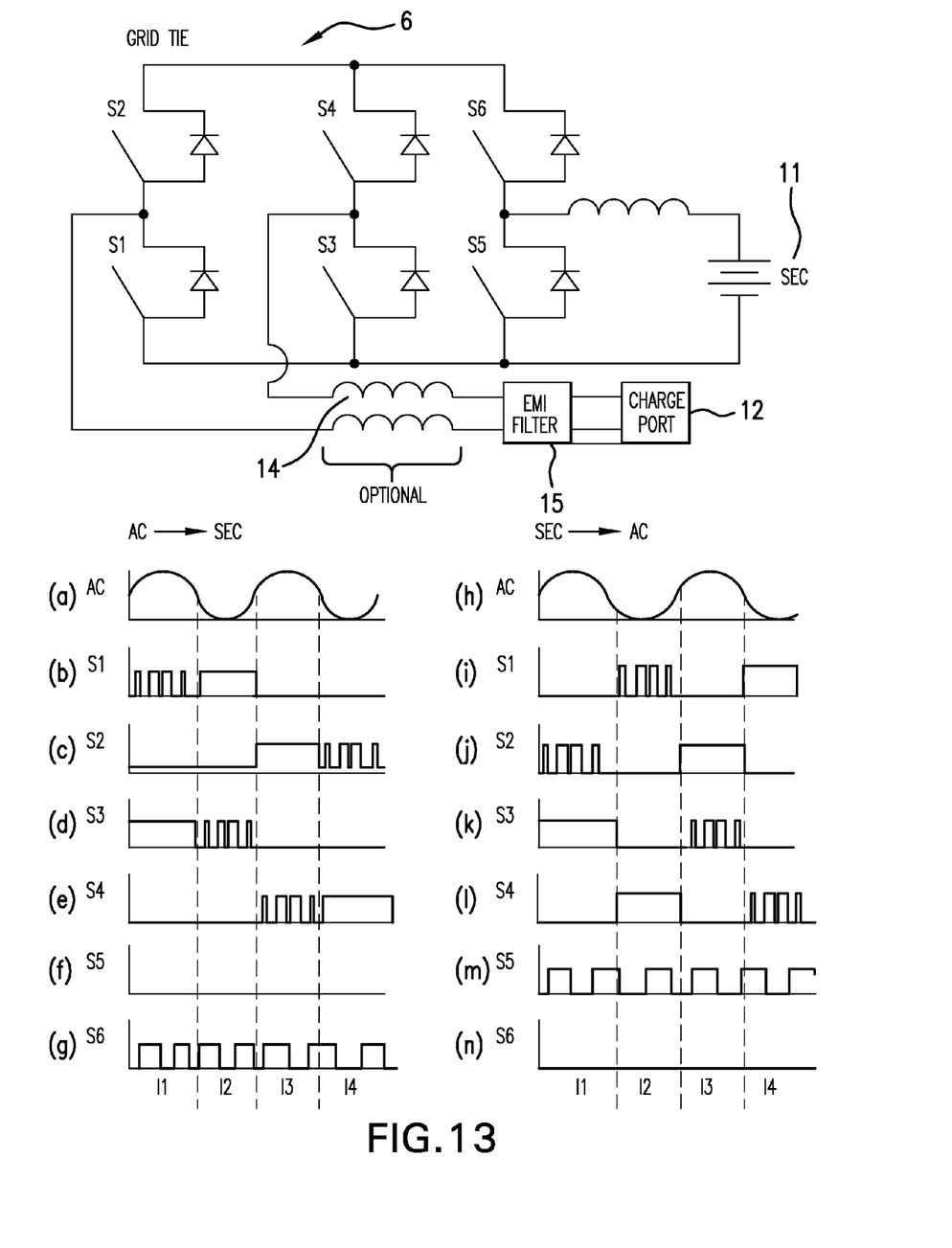
FIG. 13 is an illustrative embodiment of the bi-directional power converter in DC-to-AC (Electrical Grid Tie) mode demonstrating switching components and phases.

FIG. 13 is an example of the power converter operating in the DC-to-AC grid connect mode of the invention. In this mode, AC power can be supplied directly from (or to) the hybrid vehicle's secondary energy storage 11 (SEC) to (or from) the electrical grid 12. In this illustrative embodiment, the secondary energy source 11 is coupled to an external energy source, such as the electrical grid 12 by means of the bi-directional power converter 6. In one implementation, diodes are coupled with six switching devices S1-S6 in a parallel relationship. The grid or a charge port 12 is connected to an electromagnetic interference (EMI) filter 15, which can optionally be connected to the power converter 6 via inductors 14, which regulate energy or current flow.

FIGS. 13(*a*)-13(*g*) show an AC waveform and on/off switching states of the switches S1-S6 when the converter 6 inputs AC power and converts it into DC power for charging the secondary energy source 11. As shown in the figures, when the converter 6 receives AC power during a first phase I1 of the conversion, when the AC power is in the "positive" portion of the waveform (FIG. 13(*a*)), the switch S1 opens and closes multiple times (FIG. 13(*b*)). In another implementation, the switch S1 may open and close at non-periodic intervals. In addition, during the first phase I1, the switches S2, S4, and S5 are off, the switch S3 is on, and the switch S6 opens and closes multiple times (but less than the switch S1) (FIGS. 13(*c*)-13(*g*)).

During a second phase I2 of the conversion, when the AC power is in the "negative" portion of the waveform (FIG. 13(*a*)), the switch S3 opens and closes multiple times (FIG. 13(*d*)). In addition, during the second phase I2, the switches S2, S4, and S5 are off, the switch S1 is on, and the switch S6 opens and closes multiple times (but less than the switch S3) (FIGS. 13(*b*), 13(*c*), and 13(*e*)-13(*g*)).

During a third phase I3 of the conversion, when the AC power is in the "positive" portion of the waveform (FIG. 13(*a*)), the switch S4 opens and closes multiple times (FIG. 13(*e*)). In addition, during the third phase I3, the switches S1, S3, and S5 are off, the switch S2 is on, and the switch S6 opens and closes multiple times (but less than the switch S3) (FIGS. 13(*b*)-13(*d*), 13(*f*), and 13(*g*)).

Finally, during a fourth phase I4 of the conversion, when the AC power is in the "negative" portion of the waveform (FIG. 13(*a*)), the switch S2 opens and closes multiple times at periodic intervals (FIG. 13(*c*)). In addition, during the fourth phase I4, the switches S1, S3, and S5 are off, the switch S4 is on, and the switch S6 opens and closes multiple times (but less than the switch S3) (FIGS. 13(*b*) and 13(*d*)-13(*g*)).

After phase I4, the first through fourth phases I1 to I4 are repeated.

FIGS. 13(*h*)-13(*n*) show an AC waveform and switching states of the switches S1-S6 when the converter 6 converts DC power from the source 11 into output AC power. The operation of the converter 6 is similar to the operation described in conjunction with FIGS. 13(*a*)-13(*g*), except that the on/off switching states of the switches S1-S6 are different.

FIG. 14 is a schematic diagram demonstrating the on/off states of the switches S1-S6 during two DC-to-DC transfer modes of operation. FIGS. 14(*a*)-(*c*) and (*g*)-(*i*) (or (g')-(i')) show the switching states during the first mode, or boost mode, in which energy is transferred from the secondary energy storage 11 to the primary energy storage 7. Also, if the system implements a synchronous rectification technique, the switches S1-S6 are implemented via Metal Oxide Semi-Conductor Field Effect Transistors (MOSFETs) and diodes, which are respectively connected in parallel, as shown in the figure. This technique is used to improve efficiency during power conversion. FIGS. 14(*g*)-(*i*) show the states of the switches S2, S4, and S6 when the system does not use the synchronous rectification technique in the boost mode, and FIGS. 14(g')-(i') show the states of the switches S2, S4, and S6 when the system uses the technique.

FIGS. 14(*d*)-(*f*) and (*j*)-(*l*) (or (*j*')-(*l*')) show the switching states during the second mode, or buck mode, in which energy is transferred from the primary energy source 7 to the secondary energy source 11. FIGS. 14(*j*)-(*l*) show the states of the switches S1, S3, and S5 when the system does not use the synchronous rectification technique in the buck mode, and FIGS. 14 (*j*')-(*l*') show the states of the switches S1, S3, and S5 when the system uses the technique.

In the boost mode, when the system is not implementing the synchronous rectification technique, the controller or ECU 1 turns the switch S1 on during a first phase I1, off during a second phase I2, on during a third phase I3, and off during a fourth phase I4 (FIG. 14(*a*)). Also, the switch S3 is turned on between the starting times of the first and second phases I1 and I2, is turned off between the starting times of the second and third phases I2 and I3, and is turned on between the starting times of the third and fourth phases I3 and I4 (FIG. 14(*b*)). As in the case of the switch S3, the switch S5 is turned on and off between the starting times of the various phases I1-I4, except that the on and off times of the switch S5 occur after the corresponding on and off times of the switch S3 (FIG. 14(*c*)). By staggering the on and off times (or interleaving the phases of the on and off times) of the switches S1, S3, and S5, the ripple in the output is reduced. Also, when the system is not implementing the synchronous rectification technique in the boost mode, the switches S2, S4, and S6 are off during the phases I1-I4 (FIGS. 14(*g*)-(*i*)). On the other hand, when the system is implementing the technique, the on and off times of the switches S2, S4, and S6 are staggered during the intervals I1-I4 as shown in FIGS. 14(g')-(i').

In the buck mode, when the system is not implementing the synchronous rectification technique, the controller or ECU 1 turns the switch S2 on during a first phase I1, off during a second phase I2, on during a third phase I3, and off during a fourth phase I4 (FIG. 14(*d*)). Also, the switch S4 is turned on between the starting times of the first and second phases I1 and I2, is turned off between the starting times of the second and third phases I2 and I3, and is turned on between the starting times of the third and fourth phases I3 and I4 (FIG. 14(*e*)). As in the case of the switch S4, the switch S6 is turned on and off between the starting times of the various phases I1-I4, except that the on and off times of the switch S6 occur after the corresponding on and off times of the switch S4 (FIG. 14(*f*)). Also, when the system is not implementing the synchronous rectification technique in the buck mode, the switches S1, S3, and S5 are off during the phases I1-I4 (FIGS. 14(*j*)-(*l*)). On the other hand, when the system is implementing the technique, the on and off times of the switches S1, S3, and S5 are staggered during the intervals I1-I4 as shown in FIGS. 14 (*j*')-(*l*').

Figure 15:
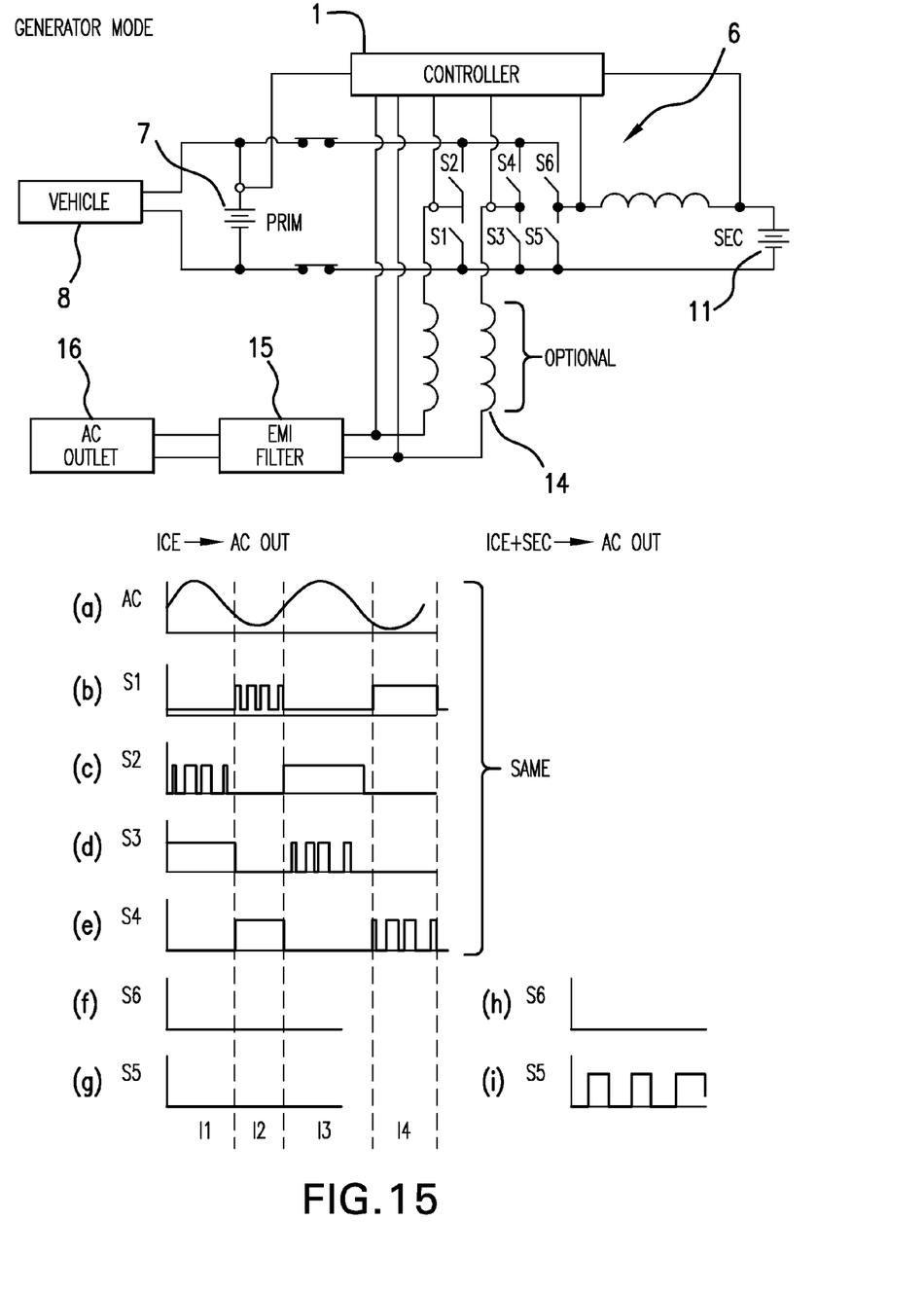
FIG. 15 is an illustrative embodiment of the bi-directional power converter in DC-to-AC (AC Generator) mode demonstrating the different switching components and phases.

FIG. 15 is a schematic diagram demonstrating the on/off states of the switches S1-S6 during a DC-to-AC transfer modes of operation in which the internal combustion engine (ICE) of the vehicle 8 is used to generated output AC power. FIG. 15(*a*) shows the output AC power, and FIGS. 15(*b*)-(*g*) show the switching states of the switches S1-S6 when the AC power is generated from the ICE. As shown in the figure, the controller 1 is coupled to the primary battery 7 and the secondary battery 11 via the power converter 6, and the AC power is supplied to an AC outlet 16, which may be located physically on the secondary energy source 11. Also, the power may be filtered through an EMI filter 15 before being output via the outlet 16, and inductors 14 may be installed to regulate the current flow to the AC outlet 16.

FIG. 15(*a*) shows a waveform of the AC power signal after it has passed through the power converter 6 as a result of kinetic energy received from the ICE of the vehicle 8. To generate the AC power, during a first phase I1, the controller 1 instructs the converter 6 to open and close the switch S2 multiple times (FIG. 15(*c*)). In addition, during the first phase I1, the switches S1 and S4-S6 are off, and the switch S3 is on (FIGS. 15(*b*) and 15(*d*)-15(*g*)).

During a second phase I2, the switch S1 opens and closes multiple times (FIG. 15(b)). Also, during the second phase I2, the switches S2, S3, S5, and S6 are off, and the switch S4 is on (FIGS. 15(c)-15(g)).

During a third phase I3, the switch S3 opens and closes multiple times (FIG. 15(d)). Furthermore, during the third phase I3, the switches S1 and S4-S6 are off, and the switch S2 is on (FIGS. 15(b), 15(c), and 15(e)-15(g)).

During a fourth phase I4, the switch S4 opens and closes multiple times (FIG. 15(e)). Also, during the fourth phase I4, the switches S2, S3, S5, and S6 are off, and the switch S1 is on (FIGS. 15(b)-15(d), 15(f), and 15(g)).

After phase I4, the first through fourth phases I1 to I4 are repeated.

In addition, the operation of the power converter 6 can be modified to convert both the energy from the ICE of the vehicle 8 and the power from the secondary energy storage 11 into AC power. The operation is the same as the previous operation, except that the controller 1 instructs the converter 6 to turn the switch S5 on and off, as shown in FIG. 13(i).

Numerous additional advantages or modifications may be realized by those having ordinary skill in the art. Accordingly, it is intended that the invention not be limited to the disclosed non-limiting embodiments but be interpreted within the full spirit and scope of the appended claims.

What is claimed is:

1. A drive system of a hybrid vehicle, comprising:
    an engine and an electric motor which provide power to the vehicle;
    a primary energy storage device which stores electrical energy;
    a secondary energy storage device which stores electrical energy;
    an electronic control unit that monitors a state of charge of said primary energy storage device and said secondary energy storage device; and
    a power converter which is operable to interface with an external electrical grid, said power converter manipulates power transfer between said primary energy storage device and said secondary energy storage device, and charges said secondary energy storage device,
    wherein said electronic control unit calculates a charge limit for said secondary energy storage device based on a charge limit table configured to identify a relationship between the voltage of the electrical grid and the charge limit so that said power converter maintains a charge current at the charge limit by setting a secondary state of charge set-point.

2. The hybrid drive system of claim 1, wherein said primary energy storage device stores energy from said engine and from said electrical grid.

3. They hybrid drive system of claim 1, wherein said secondary energy storage device stores energy from said engine and from said electrical grid.

4. The hybrid drive system of claim 1, wherein said power converter is configured to be manipulated to alternate between a charging mode, a drive mode and an electrical grid mode.

5. The hybrid drive system of claim 4, wherein said charging mode performs a AC to DC power conversion, which charges at least one of said primary energy source and said secondary energy source from an AC wall outlet.

6. The hybrid drive system of claim 4, wherein said drive mode performs DC to AC power conversions, such that AC power is produced from at least one of said primary energy storage device and said secondary energy storage device.

7. The hybrid drive system of claim 4, wherein said drive mode allows a DC power conversion from said energy storage devices, either individually or collectively, to propel said hybrid vehicle.

8. The hybrid drive system of claim 4, wherein said electrical grid mode performs a DC to AC power conversion, which allows said energy storage devices to produce energy which is utilized by the electrical grid.

9. A multi-directional power conversion system for providing power to a motor of a hybrid vehicle comprising:
    an electric control unit;
    an electric motor which provides a driving force to the vehicle;
    a primary energy storage device;
    a secondary energy storage device;
    an energy management system which communicates parameters of said primary energy storage device and said secondary energy storage device to said electronic control unit; and
    a power manipulating device which is operable to interface with an external energy system, said power manipulating device is coupled between said primary energy storage device and said secondary energy storage device to manage power sent to said electric motor and to charge said secondary energy storage device,
    wherein said energy management system calculates a charge limit for said secondary energy storage device based on a charge limit table configured to identify a relationship between the voltage of the external energy system and the charge limit so that said power manipulating device maintains a charge current at the charge limit by setting a secondary state of charge set-point.

10. The power conversion system of claim 9, wherein said power manipulating device manages power according to different operation modes of said hybrid vehicle.

11. The power conversion system of claim 9, wherein said electric control unit controls said power manipulating device to transfer energy between said secondary energy storage device, said primary energy storage device and said electric motor based on parameters supplied by said energy management system.

12. The power conversion system of claim 9, wherein said electric control unit communicates with said energy management system to alter an operating mode of the vehicle.

13. The power conversion system of claim 9, wherein said electric control unit maintains a state of charge of said primary energy storage device and said secondary energy storage device in accordance with information received from said energy management system.

14. The power conversion system of claim 9, wherein said power manipulating device alters an operation mode of said vehicle to utilize power from said primary energy storage device and said secondary energy storage device, either individually or collectively.

15. The power conversion system of claim 9, wherein said energy management system provides said electric control unit with parameters comprising vehicle speed, engine load, battery temperature, and voltage amounts of said energy storage devices.

16. The power conversion system of claim 9, wherein said electric control unit modifies a flow of energy between said energy storage devices and said electric motor to maintain a state of charge of said energy storage devices in accordance with information received from said energy management system.

17. The power conversion system of claim 9, wherein said electric control unit disables said hybrid drive system when said power conversion system is connected to the external energy system.

18. The power conversion system of claim 9, wherein said power manipulating device comprises a buck-boost converter.

19. The power conversion system of claim 18, wherein said power manipulating device provides DC-to-DC conversion to boost a dc voltage of said primary energy storage device.

20. The power conversion system of claim 18, wherein said power manipulating device provides DC-to-DC conversion to buck or transfer DC voltage from said primary energy storage device to said secondary energy storage device.

21. The power conversion system of claim 9, wherein said power manipulating device provides AC-to-DC conversion to allow charging of said energy storage devices.

22. The power conversion system of claim 9, wherein said power manipulating device is configured to provide a DC-to-AC conversion for sending AC external to the vehicle.

23. The power conversion system of claim 9, wherein said power manipulating device is configured to provide a DC-to-AC conversion, wherein AC is provided to a load external the vehicle.

\* \* \* \* \*